(12) United States Patent
Südow et al.

(10) Patent No.: US 10,067,251 B2
(45) Date of Patent: Sep. 4, 2018

(54) STRESS MEMBER CONNECTOR

(71) Applicant: PGS Geophysical AS, Oslo (NO)

(72) Inventors: Mattias Südow, Kista (SE); Clet Landry, Houston, TX (US)

(73) Assignee: PGS Geophysical AS, Oslo (NO)

( * ) Notice: Subject to any disclaimer, the term of this patent is extended or adjusted under 35 U.S.C. 154(b) by 170 days.

(21) Appl. No.: 15/152,760

(22) Filed: May 12, 2016

(65) Prior Publication Data

US 2016/0377750 A1    Dec. 29, 2016

Related U.S. Application Data

(60) Provisional application No. 62/185,841, filed on Jun. 29, 2015.

(51) Int. Cl.
*G01V 1/38* (2006.01)
*G01V 1/20* (2006.01)

(52) U.S. Cl.
CPC .............. *G01V 1/202* (2013.01); *G01V 1/201* (2013.01); *G01V 1/38* (2013.01)

(58) Field of Classification Search
CPC .......... G01V 1/38; G01V 1/201; G01V 1/202; Y10T 403/55; Y10T 403/556
USPC ........................................... 367/20, 153–154
See application file for complete search history.

(56) References Cited

U.S. PATENT DOCUMENTS

| 933,625 | A | * | 9/1909 | Clarkson | ................. | F16G 15/08 |
| | | | | | | 403/164 |
| 4,500,980 | A | | 2/1985 | Copeland | | |
| 4,526,430 | A | | 7/1985 | Williams | | |
| 4,530,075 | A | | 7/1985 | Pearson | | |
| 4,600,331 | A | * | 7/1986 | Gray | ....................... | F16G 15/08 |
| | | | | | | 403/165 |
| 4,694,436 | A | | 9/1987 | Gelfand | | |
| 5,274,603 | A | | 12/1993 | Zibilich, Jr. et al. | | |
| 5,772,350 | A | * | 6/1998 | Ferguson | ................ | E21B 17/05 |
| | | | | | | 277/345 |
| 6,554,524 | B1 | * | 4/2003 | Smith | ...................... | H02G 7/04 |
| | | | | | | 403/164 |
| 8,995,221 | B2 | | 3/2015 | Stenzel | | |
| 2011/0058449 | A1 | | 3/2011 | Stenzel | | |

OTHER PUBLICATIONS

European Search Report for related EP Application No. 161754163, dated Dec. 2, 2016 (8 pgs).

* cited by examiner

*Primary Examiner* — Ian J Lobo (57) ABSTRACT

A system can include a head connector, a stress member connector, and a tail connector. The system can include a first plurality of stress members coupled to the head connector and to the stress member connector. The first plurality of stress members can enter through a first side of the stress member connector. The system can include a second plurality of stress members coupled to the tail connector and to the stress member connector. The second plurality of stress members can exit through a second side of the stress member connector. The second plurality of stress members can be axially nonaligned with the first plurality of stress member connectors.

25 Claims, 9 Drawing Sheets

STRESS MEMBER CONNECTOR

CROSS-REFERENCE TO RELATED APPLICATIONS

This application claims priority to U.S. Provisional Application 62/185,841, filed Jun. 29, 2015, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface of the water and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

DETAILED DESCRIPTION

The present disclosure is related to stress member connectors. A stress member connector is a mechanical device that can be used for coupling stress members on one side of the stress member connector to stress members on a different side of the stress member connector. Examples of stress members include rope (such as synthetic rope made from nylon, Kevlar, etc.), metallic cable, and elastic bands, among others. The stress member connectors can be used to distribute and absorb a mechanical load of a streamer, such as a marine streamer. For example, a streamer can have a mechanical load applied thereto by being pushed and/or pulled in varying directions while being pulled through a body of water. As used herein, a stress member is an elongate body within a streamer that can alleviate and/or distribute movement that would be caused by the mechanical load. The stress member connectors can hold stress members together across portions of the streamer and be partially and/or fully enclosed and/or housed within the number of portions of the streamer. The streamer can be a part of a platform used to gather data. Mechanical noise from the mechanical load of the streamer in a low frequency portion of the signal spectra can affect the gathering of the data. Mechanical noise can be caused by movement of the streamer and may increase inaccuracies in the gathered data. Mechanical noise can be attributed to mechanical vibrations due to the mechanical load while towing the streamer.

The mechanical noise can include common mode noise and differential mode noise. Common mode noise can be caused by stress members and/or streamers vibrating axially in unison along a portion of a streamer. Differential mode noise can be caused by stress members and/or streamers vibrating differentially due to differential stress, as opposed to vibrating in unison. In some previous approaches, stress members were lined up axially, or in parallel along the streamer from portion to portion. For example, stress members entering a stress member connector were aligned axially with stress members exiting the stress member connector. Such approaches would be less likely to reduce differential mode noise. However, according to at least one embodiment of the present disclosure, stress members entering a stress member connector can be axially nonaligned with stress members exiting the stress member connector. For example, slots for receiving the stress members can be positioned horizontally or vertically with respect to each other. The slots can be spaced apart by a particular number of degrees, depending on perspective. As an example, the particular number of degrees can be 90 degrees, 120 degrees, etc. By altering the alignment of the entering stress members and the exiting stress members, differential mode noise can be distributed and/or modified, which can decrease inaccuracies of the gathered data. Slots receiving entering stress members can be in a first orientation and the slots receiving exiting stress members can be in a second orientation such that differential noise is distributed differently than when stress members entering and exiting are in a same orientation. The slots receiving entering stress members are sometimes referred to herein as a first set of slots. The slots receiving exiting stress members are sometimes referred to herein as a second set of slots. For purposes of this description, an entering stress member is a stress member associated with a streamer portion that is more proximal to the vessel than the stress member, and an exiting stress member is a stress member associated with a streamer portion that is more distal from the vessel than the stress member. By way of example, the first orientation can be a horizontal orientation where the first set of slots are parallel to each other. The second orientation can be a vertical orientation that is orthogonal to the first set of slots, where the second set of slots are parallel to each other, but orthogonal to the first set of slots.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "including," and derivations thereof, means "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 334 may reference element "34" in FIG. 3A, and a similar element may be referenced as 434 in FIG. 4A. As will be appreciated, elements shown herein can be added, exchanged, and/or eliminated so as to provide additional embodiments of the present disclosure. In addition, as will be appreciated, the proportion and the relative scale of the elements provided in the figures are intended to illustrate certain embodiments of the present invention, and should not be taken in a limiting sense.

Figure 1:
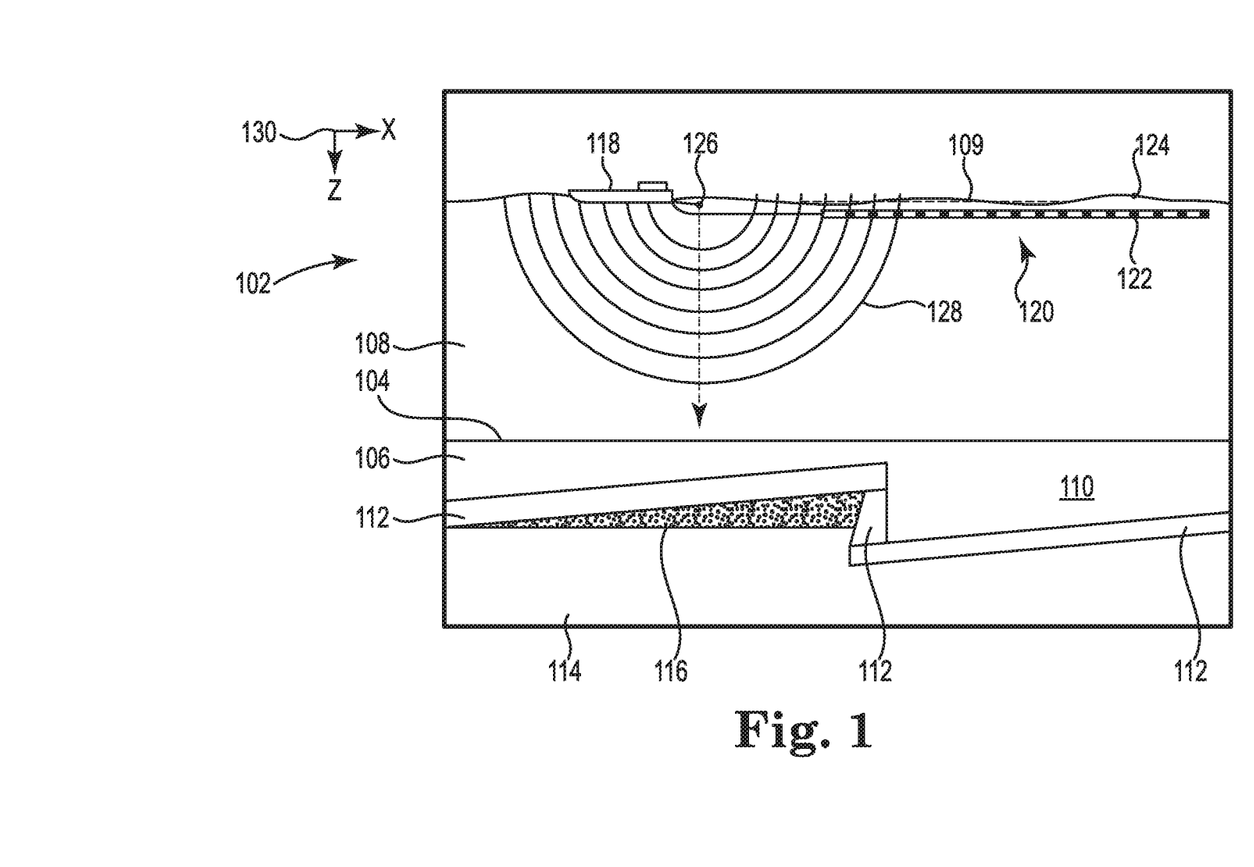
FIG. 1 illustrates an elevation or xz-plane view of marine surveying in which signals are emitted by a source for recording by receivers for processing and analysis in order to help characterize the structures and distributions of features and materials underlying the surface of the earth.

FIG. 1 illustrates an elevation or xz-plane 130 view of marine surveying in which signals are emitted by a source 126 for recording by receivers 122 for processing and analysis in order to help characterize the structures and distributions of features and materials underlying the surface of the earth. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines, such as electrical, optical fiber, etc., to which receivers may be coupled. In one type of marine survey, each receiver, such as the receiver 122 represented by the shaded disk in FIG. 1, comprises a pair of sensors including a motion sensor such as a geophone, accelerometer, etc., that detects particle displacement within the water by detecting particle motion variation, such as velocities or accelerations, and/or a hydrophone that detects variations in pressure. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can also tow one or more sources 126 that produce signals as the marine survey vessel 118 and streamers 120 move across the sea surface 109. Sources 126 and/or streamers 120 may also be towed by other vessels, or may be otherwise disposed in fluid volume 108. For example, receivers may be located on ocean bottom cables or nodes fixed at or near the surface 104 of the earth, and sources 126 may also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes.

FIG. 1 shows an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 may eventually reach the surface 104 of the earth, at which point the outward and downward expanding down-going wavefield 128 may partially scatter, may partially reflect back toward the streamers 120, and may partially refract downward into the subsurface volume 106, becoming elastic signals within the subsurface volume 106.

Figure 2:
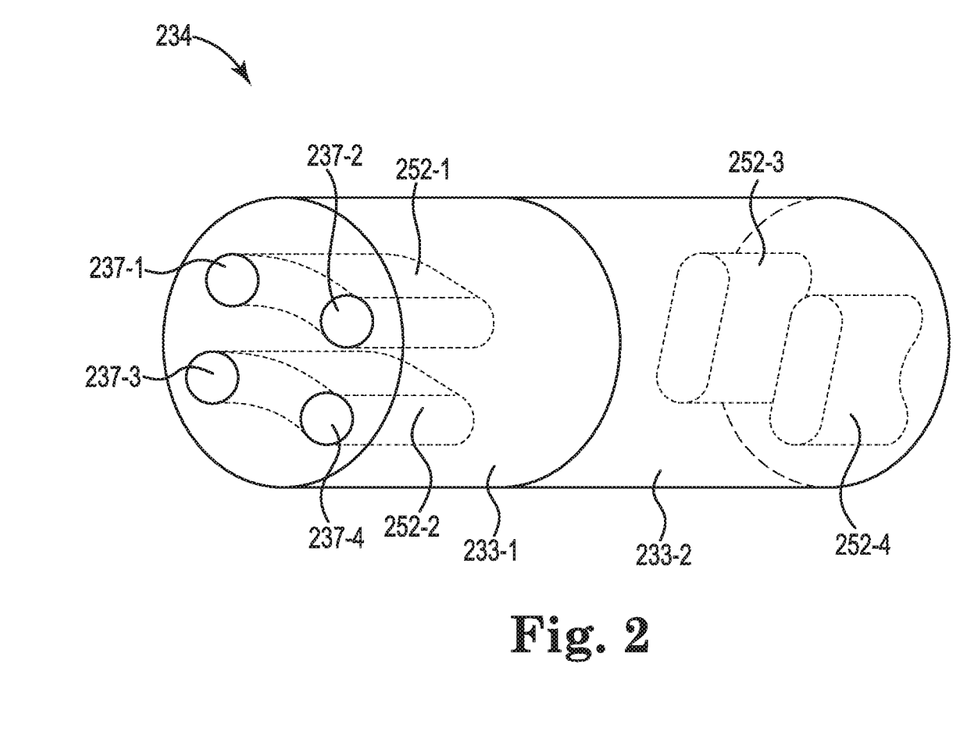
FIG. 2 illustrates a stress member connector.

FIG. 2 illustrates a stress member connector 234. The stress member connector 234 can include a first component 233-1 and a second component 233-2 coupled together. The first component 233-1 and the second component 233-2 are referred to herein as neighboring components because they are coupled to each other. The first component 233-1 includes a first set of slots including a first slot 252-1 and a second slot 252-2. The first slot 252-1 can include a first aperture 237-1 and a second aperture 237-2. The first aperture 237-1 and the second aperture 237-2 can be visible and the first slot 252-1 can be within the first component 233-1 (indicated by dotted lines). The second slot 252-2 can include a third aperture 237-3 and a fourth aperture 237-4. The third aperture 237-3 and the fourth aperture 237-4 can be visible and the second slot 252-2 can be within the first component 233-1. That is, an object can enter the first aperture 237-1 and travel across the first slot 252-1 and exit out the second aperture 237-2, and likewise for the third aperture 237-3 and the fourth aperture 237-4 with the second slot 252-2. The first slot 252-1 and the second slot 252-2 can be in a first orientation (such as a horizontal orientation). The first slot 252-1 and the second slot 252-2 can be parallel to each other. The first slot 252-1 and the second slot 252-2 are sometimes referred to herein as a first set of slots.

The second component 233-2 includes a second set of slots including a third slot 252-3 and a fourth slot 252-4. The third slot 252-3 can be within the second component 233-2 and can include a fifth aperture (not illustrated, but similar to aperture 445-1 in FIG. 4C) and a sixth aperture (not illustrated, but similar to aperture 445-2 in FIG. 4C). The fourth slot 252-4 can be within the second component 233-2 and can include a seventh aperture (not illustrated, but similar to aperture 445-3 in FIG. 4C) and an eighth aperture (not illustrated, but similar to aperture 445-4 in FIG. 4C). See FIGS. 4B-4F for an illustration of the slots and apertures and their orientation within the components. The third slot 252-3 and the fourth slot 252-4 can be in a second orientation (such as a vertical orientation). The third slot 252-3 and the fourth slot 252-4 can be parallel to each other. The third slot 252-3 and the fourth slot 252-4 are sometimes referred to herein as a second set of slots. The first orientation and the second orientation can be orthogonal orientations where the first set of parallel slots are non-parallel and/or orthogonal to the second set of parallel slots.

The first slot 252-1 is configured to receive a first stress member (for example, first stress member 350-1 illustrated in FIG. 3A) into the first component 233-1 at a first orientation. For example, the first orientation is illustrated as a horizontal orientation. The second slot 252-2 is configured to receive a second stress member (for example, second stress member 350-2 illustrated in FIG. 3A) into the first component 233-1 at an orientation similar and/or the same as the first orientation. For example, the second slot 252-2 is also illustrated in a horizontal orientation. The third slot 252-3 is configured to receive a third stress member (for example, third stress member 350-3 illustrated in FIG. 3A) into the second component 233-2 at a second orientation. For example, the second orientation is illustrated as a vertical orientation. The fourth slot 252-4 is configured to receive a fourth stress member (for example, fourth stress member 350-4 illustrated in FIG. 3A) into the second component 233-2 in the second orientation. For example, the fourth slot 252-4 and the third slot 252-3 are illustrated in a same vertical orientation referred to as a second orientation.

While the first and the second orientations are illustrated as horizontal and vertical in this example, embodiments are not so limited. The first and second orientations can be, for example, non-parallel and non-orthogonal to each other. In at least one embodiment, a component of a stress member connector can include more than two slots to receive more than two stress members. The relative orientations of the slots can be based on the total number of slots. The slots can be oriented relative to each other at different angles.

Advantageously, in contrast to some previous approaches, having different orientations of slots (and thus the stress members that are received in the slots) for neighboring components of the stress member connector can distribute and/or reduce differential noise more effectively than having a same orientation for neighboring components of the stress member connector. While such previous approaches may provide mechanical robustness by keeping stress members axially in line, differential noise would be greater.

Figure 3A:
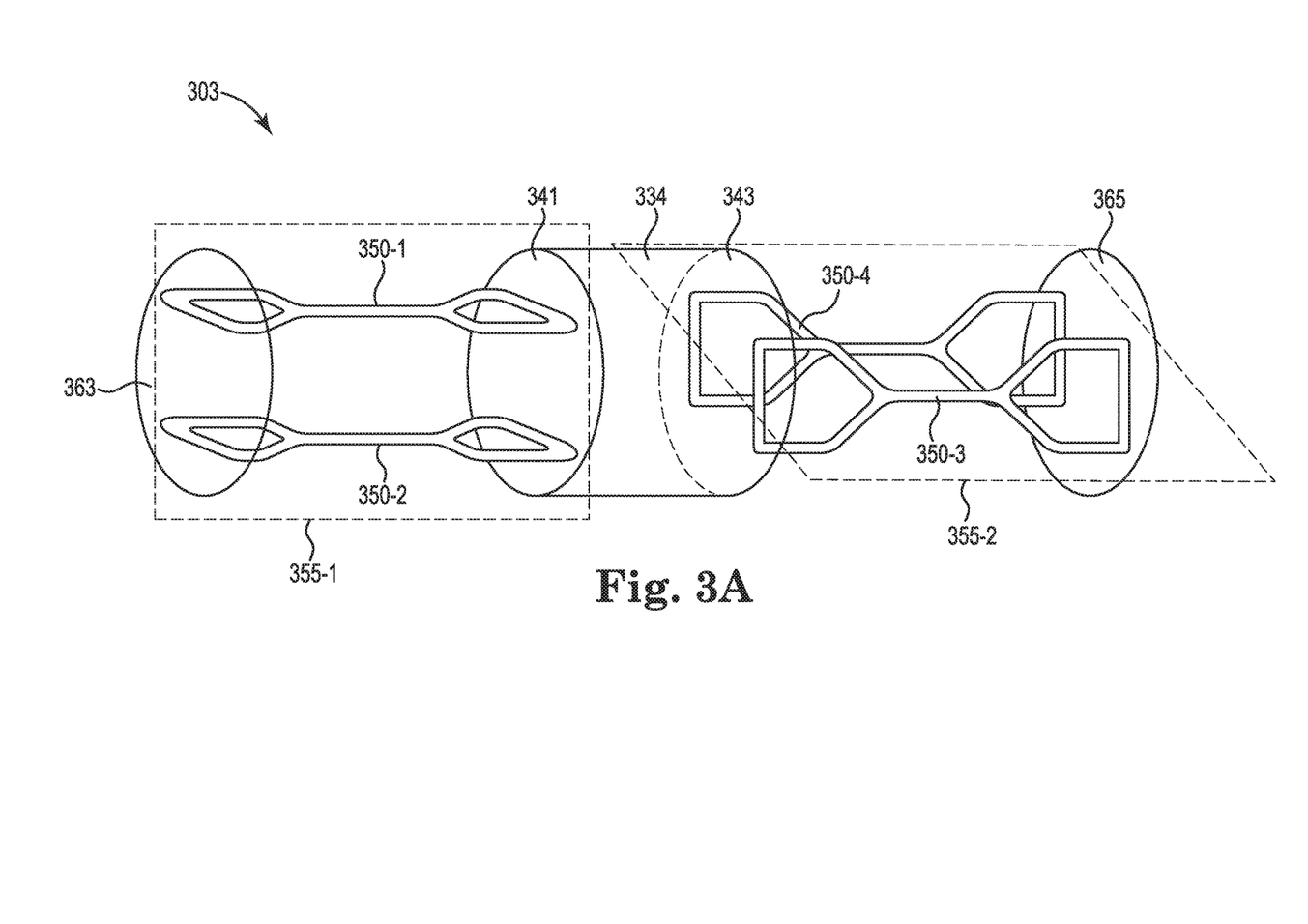
FIGS. 3A-3B each illustrates a system for distributing and absorbing a mechanical load.
Figure 3B:
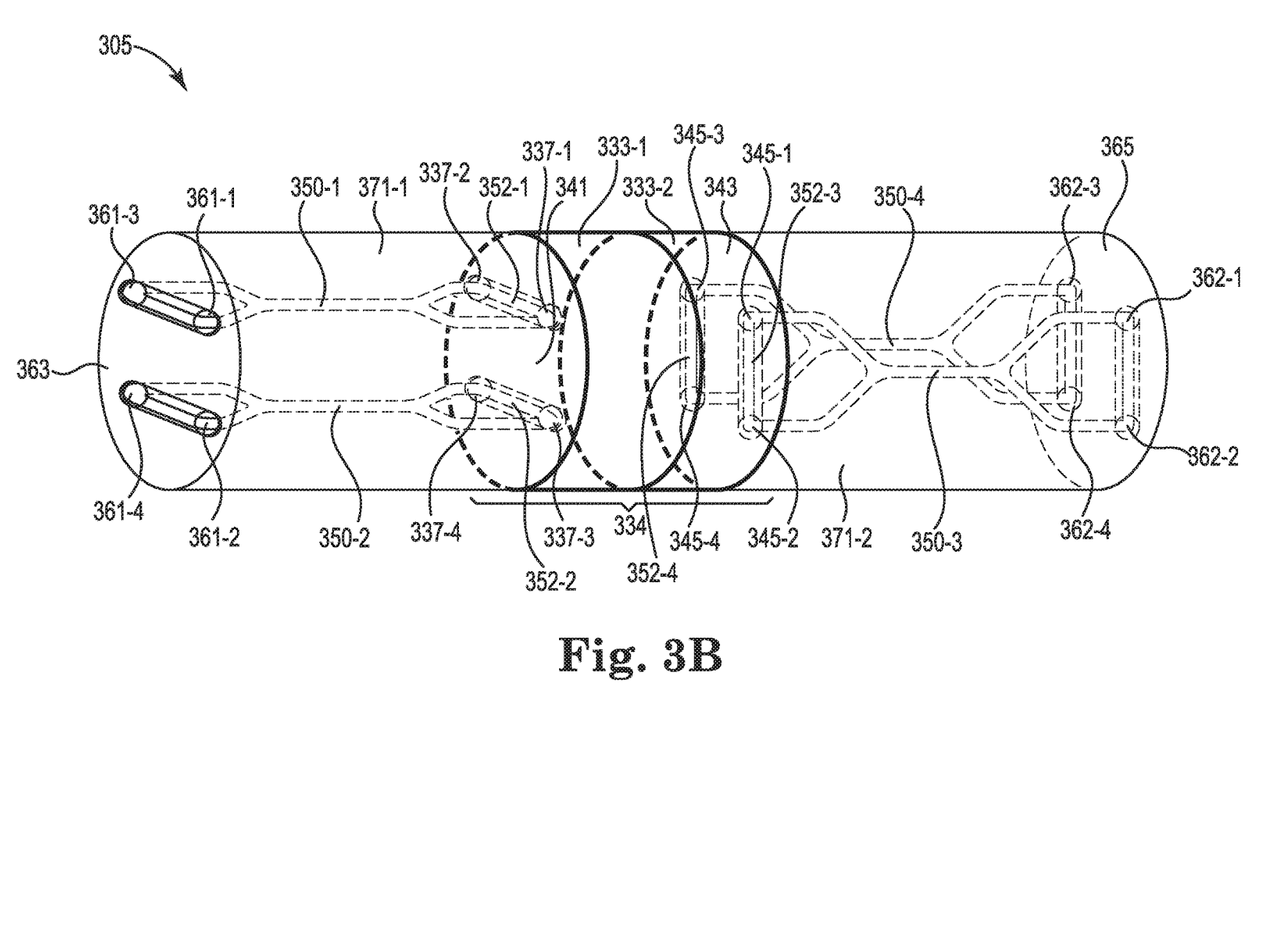

FIGS. 3A-3B each illustrate a system for distributing and absorbing a mechanical load. FIG. 3A illustrates a system 303 that includes a stress member connector 334. The stress member connector 334 includes a first side 341 and a second side 343. The first side 341 can be located at a posterior end of a streamer that is proximal to a marine vessel pulling the streamer and face toward the marine vessel. The second side 343 can be located at an anterior end of a streamer that is distal from the marine survey vessel pulling the streamer and face away from the marine vessel. A head connector 363 can be coupled to a first plurality of stress members and the stress members can be coupled to a stress member connector. For example, a first stress member 350-1 and a second stress member 350-2 can be coupled to the head connector 363 and to the stress member connector 334 through a first side 341 of the stress member connector 334. The head connector 363 can be at the head of a streamer portion proximal to the marine survey vessel pulling the streamer. As an example, the head connector 363 can be located approximately 3-5 meters from the stress member connector 334 in a direction toward the marine survey vessel pulling the streamer. The head connector 363 can include electrical and/or mechanical interfaces. For example, a head connector can include a plugin and/or electrical connections for sensors and/or other electronic apparatuses to be connected through the streamer (not illustrated in FIG. 3A). In this way, electrical connections (575 in FIG. 5B) can begin at an electrical connection point in the head connector, run a length of a streamer portion, and end at an electrical connection point in the tail connector of a neighboring streamer portion. This allows for ease of disconnection of a first streamer portion from a second streamer portion by unplugging the electrical connections from the head connector and the tail connector in order to separate the two portions. This also allows for ease of reconnection of the first streamer portion and the second streamer portion by plugging in the electrical connections to the head connector and the tail connector.

A tail connector 365 can be coupled to a second plurality of stress members and the stress members can be coupled to a stress member connector. For example, a third stress member 350-3 and a fourth stress member 350-4 can be coupled to the tail connector 365 and to the stress member connector 334 through a second side 343 of the stress member connector 334. As an example, the head connector 363 can be located 75 meters from the tail connector 365 and the tail connector 365 can be located about 72 meters from the stress member connector 334. In at least one embodiment, a streamer section can be 100 m. In at least one embodiment, a streamer section can be 150 m. The second plurality of stress members, such as stress members 350-3 and 350-4, can be axially nonaligned with the first plurality of stress members, such as stress members 350-1 and 350-2, as illustrated in FIG. 3A The first stress member 350-1 and the second stress member 350-2 can be generally parallel to each other and can define a first plane 355-1. The third stress member 350-3 and the fourth stress member 350-4 can be generally parallel to each other and can define a second plane 355-2. The first plane and the second plane can be antiparallel. For example, the first plane 355-1 and the second plane 355-2 can be orthogonal to one another, such as at right angles. As another example, the first plane 355-1 and the second plane 355-2 can be generally orthogonal. As used herein, "generally orthogonal" can include right angles, angles that are closer to right angles than to 45 degree angles, and/or angles that are within 5 degrees of a right angle.

FIG. 3B illustrates a system 305 that includes a first component 333-1 and a second component 333-2 of a stress member connector 334 (illustrated with bold lines for ease of reference). The first component 333-1 can be fixedly coupled to the second component 333-2. For example, "fixedly coupled" can mean that the first component 333-1 is coupled to a connecting component (such as connecting component 435 in FIG. 4A) through a first side of the connecting component and the second component 333-2 is coupled to the connecting component through a second side of the connecting component. The coupling can include welding and/or fusing, fastening by nuts, bolts, and/or fastening materials such as adhesives. "Fixedly coupled" can refer to, for example, being movable until coupled and, once coupled, the components do not move with respect to each other unless and/or until they are purposefully disconnected or decoupled. A specific example of such a coupling is illustrated in FIGS. 4A-4G.

The first component 333-1 can have a first side 341 and the second component 333-2 can have a second side 343. The first side 341 can include a plurality of apertures 337-1, 337-2, 337-3, and 337-4. Apertures can refer to openings, holes, etc. The plurality of apertures 337-1, 337-2, 337-3, 337-4 can each be equally spaced from the other of the plurality of apertures 337-1, 337-2, 337-3, 337-4. For example, a first aperture 337-1 can be equally spaced from each of apertures 337-2, 337-3, and 337-4. A first stress member 350-1 can be coupled to the first component 333-1 through the apertures 337-1 and 337-2 on the first side 341 of the first component 333-1 and through a slot 352-1. That is, the first stress member 350-1 can enter the first side 341 through an aperture 337-1, travel through a slot 352-1, and exit the first side 341 through an aperture 337-2 (or vice versa, depending on perspective). In at least one embodiment, the stress member 350-1 can be a single rope with intertwining rope portions that are separated towards an end that is to be received by apertures 337-1 and 337-2. The separated intertwining rope portions can be intertwined back together in a slot 352-1 to form a loop through the apertures 337-1 and 337-2 and the slot 352-1. The first stress member 350-1 can be coupled to a head connector 363 through apertures 361-1 and 361-3. The stress member 350-1 can be secured through the apertures 361-1 and 361-3 to the head connector 363 (not fully illustrated) and/or can be attached through a slot between the apertures 361-1 and 361-3 as with the coupling at the first component 333-1. A second stress member 350-2 can be coupled to the first component 333-1 at a slot 352-2 through apertures 337-3 and 337-4 on the first side 341 of the first component 333-1. That is, the second stress member can enter the first side 341 through the aperture 337-3, travel through the slot 352-2, and exit the first side 341 through the aperture 337-4 (or vice versa, depending on perspective).

Slot 352-1 and slot 352-2 can make up a set of parallel slots in a first orientation. Slots 352-1, 352-2 are sometimes referred to herein as a first and second slot, respectively, that make up a first set of parallel slots. The first orientation can refer to an orientation that is horizontal, as illustrated, where the slots are parallel. That is, a first set of parallel slots in a first orientation, such as slots 352-1 and 352-2, can be configured to receive a first set of stress members, such as stress members 350-1 and 350-2. In this way, a plurality of apertures, such as apertures 337-1, 337-2, 337-3, 337-4, can be in communication with a first set of parallel slots, such as slots 352-1 and 352-2. More specifically, a first aperture 337-1 and a second aperture 337-2 can be in communication with a first slot 352-1 and configured to receive a first stress member 350-1. A third aperture 337-3 and a fourth aperture 337-4 can be in communication with a second slot 352-2 and configured to receive a second stress member 350-2.

Slot 352-3 and slot 352-4 can make up a set of parallel slots in a second orientation. Slots 352-3, 352-4 are sometimes referred to herein as a third and fourth slot, respectively, that make up a second set of parallel slots. That is, a second set of parallel slots in a second orientation, such as slots 352-3 and 352-4, can be configured to receive a second set of stress members, such as stress members 350-3 and 350-4. The second orientation can refer to an orientation that is vertical, as illustrated, where the slots are parallel. That is, a second set of parallel slots, such as slots 352-3 and 352-4, can be configured to receive a second set of stress members, such as stress members 350-3 and 350-4. In this way, a plurality of apertures, such as apertures 345-1, 345-2, 345-3, 345-4, can be in communication with a second set of parallel slots, such as slots 352-3 and 352-4. The first set of parallel slots and the second set of parallel slots can be generally orthogonal and/or non-parallel to one another. The second stress member 350-2 can be coupled to a head connector 363 through apertures 361-2 and 361-4. As the first orientation is illustrated as horizontal, the stress members 350-1 and 350-2 can redistribute and/or alleviate mechanical noise, in this example, in relation to an upward and downward mechanical movement. As used herein, the terms "horizontal" and "vertical" are descriptive of relative orientations for illustrative purposes and do not imply or limit any individual orientation. For example, in operation, individual orientations may not align with any arbitrary horizontal or vertical axis, but the relative orientations remain as described in relation to one another.

The second side 343 of the second component 333-2 includes the apertures 345-1, 345-2, 345-3, and 345-4 and the slots 352-3 and 352-4. The third stress member 350-3 can be coupled to the second component 333-2 through the apertures 345-1 and 345-2 on the second side 343 of the second component 333-2 and the slot 352-3. The third stress member 350-3 can be coupled to the tail connector 365 through the apertures 362-1 and 362-2. A fourth stress member 350-4 can be coupled to the second component 333-2 through the apertures 345-3 and 345-4 on the second side 343 of the second component 333-2 and the slot 352-4. The fourth stress member 350-4 can be coupled to the tail connector 365 through the apertures 362-3 and 362-4.

As illustrated, if the streamer portion 371-1 moves upward, tension would increase on the stress member 350-2, and if the streamer portion 371-1 moves downward, tension would increase on the stress member 350-1. This can effectively dampen motion in an upward and/or downward direction. In a juxtaposed manner, if streamer portion 371-2 moves away from the viewer (or into the page), tension would increase on the stress member 350-4, and if the streamer portion 371-2 moves toward the viewer or out of the page), tension would increase on the stress member 350-3. This can effectively dampen motion in a sideways direction. Such an arrangement can reduce or eliminate differential mode stress transfer across the stress member connector 334 that would otherwise occur if the stress members were axially aligned across the stress member connector 334. A differential mechanical input to the stress member connector 334 in a plane defined by the entering stress members would cause a pivoting action around the plane formed by the exiting stress members, which can result in a negligible output.

Figure 4A:
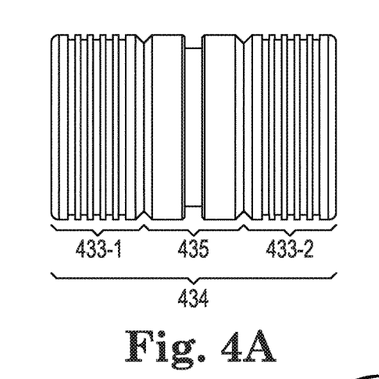
FIGS. 4A-4G illustrate various views of a stress member connector and/or a portion thereof.

FIGS. 4A-4G each illustrate various views of a stress member connector 434 and/or a portion thereof. FIG. 4A illustrates a side view of a stress member connector 434 including a first component 433-1, a second component 433-2, and a connecting component 435. The stress member connector 434 can be composed of a particular type of metal (steel, iron, etc.) or other materials having suitable strength such as synthetic materials, Kevlar, ceramics, etc. The first component 433-1 and the second component 433-2 can include circumferential grooves (illustrated as many lines next to each other) for coupling an outer jacket (not illustrated) of a streamer to the first and second components 433-1, 433-2. Clamps such as ring clamps can use the circumferential grooves to anchor the outer jacket to the connectors. The first component 433-1 and the second component 433-2 can each be fastened to a respective side of the connecting component 435 for coupling thereto. The connecting component 435 can include a circular ring at each end of the connecting component 435 to receive each of the first component 433-1 and the second component 433-2. The connecting component 435 can be immovably coupled to the first and second components 433-1 and 433-2 and the connecting component 435 can be positioned between the first component 433-1 and the second component 433-2. That is, the first and second components 433-1 and 433-2 are coupled together such that the first component 433-1 does not move in relation to the second component 433-2, and vice versa.

Figure 4B:
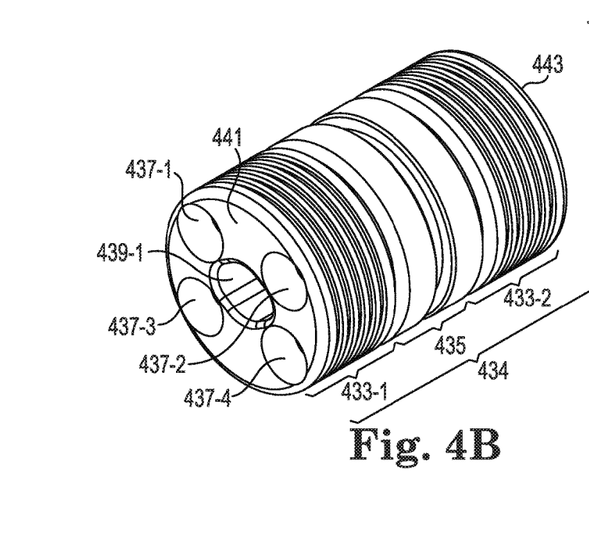

FIG. 4B illustrates a first perspective view of the stress member connector 434 including the first component 433-1, the second component 433-2, and the connecting component 435. FIG. 4B includes the same components as FIG. 4A and includes a first side 441 of the stress member connector 434 being viewed by turning the left side of stress member connector 434 in FIG. 4A towards the viewer. For example, the first side 441 illustrates the left side of the stress member connector 434 turned towards the viewer about 30 degrees in a mostly counterclockwise direction. The first side 441 of the stress member connector 434 includes four apertures 437-1, 437-2, 437-3, and 437-4 and a central aperture 439-1. The central aperture 439-1 can be used to house electrical and/or sensor connections along the body of the streamer, from portion to portion of the streamer.

Figure 4C:
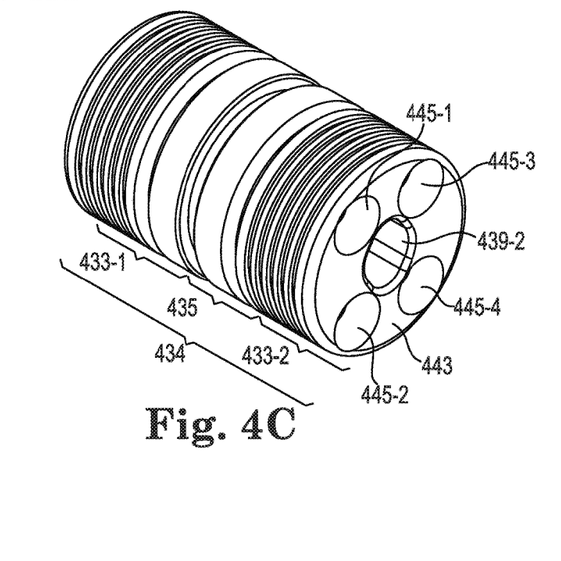

FIG. 4C illustrates a second perspective view of the stress member connector 434 including the first component 433-1, the second component 433-2, and the connecting component 435. These are the same components illustrated in FIGS. 4A-4B. FIG. 4C illustrates a view of the stress member connector 434 in FIG. 4A where the right side is rotated towards the viewer approximately 30 degrees in a clockwise direction. A second side 443 of the stress member connector 434 includes a plurality of apertures (in this example, four apertures) 445-1, 445-2, 445-3, and 445-4 and a central aperture 439-2. The plurality of apertures 445-1, 445-2, 445-3, and 445-4 can be configured to receive the second set of stress members, such as 350-3 and 350-4 in FIG. 3B. The central aperture 439-2 can be continuous with the central aperture 439-1 in FIG. 4B to allow electrical and/or sensor connections to travel within and/or across the stress member connector 434.

Figure 4D:
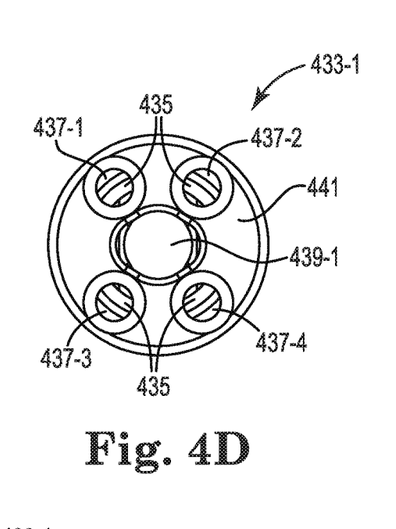

FIG. 4D illustrates a front view of the first side 441 of the stress member connector 434. The first side 441 is a straight-on view of the first side 441 illustrated in FIG. 4B. The first side 441 includes apertures 437-1, 437-2, 437-3, and 437-4. The connecting component 435 is viewed through apertures 437-1, 437-2, 437-3, and 437-4 as FIG. 4D is a straight-on view of FIG. 4B (including connecting component 435 in between first component 433-1 and second component 433-2).

Figure 4E:
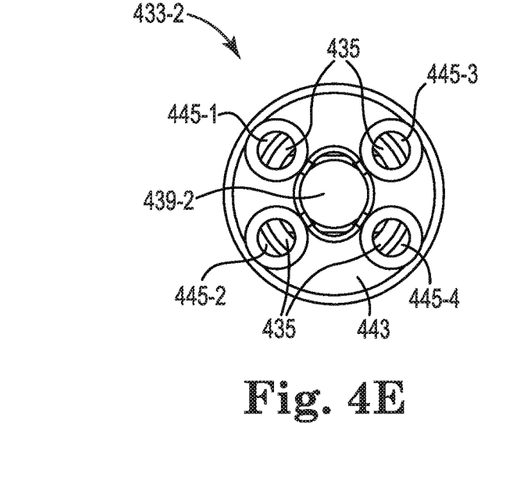

FIG. 4E illustrates a front view of the second side 443 of the stress member connector. The second side 443 of the stress member connector is viewed straight-on, as illustrated in FIG. 4C. The second side 443 includes apertures 445-1, 445-2, 445-3, and 445-4. The connecting component 435 is viewed through apertures 445-1, 445-2, 445-3, and 445-4 as FIG. 4E is a straight-on view of FIG. 4C.

Figure 4F:
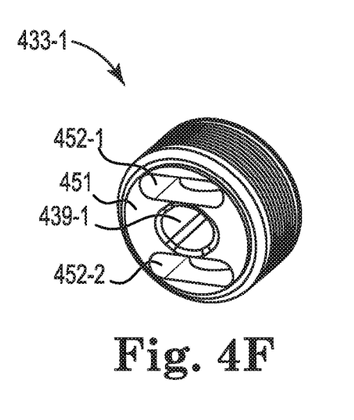

FIG. 4F illustrates a perspective view of the first component 433-1. The first component 433-1 includes the first side 441, as illustrated in FIG. 4B, and a first face 451. The first face 451 is located between the first component 433-1 and the connecting component 435 and is illustrated as visible by separating the first component 433-1 and the connecting component 435 and turning the right side of the first component 433-1 in FIG. 4A toward the viewer. The first face 451 of the first component 433-1 can include a first set of parallel slots, such as slots 452-1 and 452-2. The first component 433-1 in FIG. 4F includes a first slot 452-1 and a second slot 452-2. The first slot 452-1 and the second slot 452-2 can be a set of parallel slots. The first and second slots 452-1 and 452-2 are configured to receive stress members (for example, stress members 350-1 and 350-2 as illustrated in FIG. 3B). For example, a first stress member can enter through an aperture 437-1, in FIG. 4D, travel within the slot 452-1, and exit out of the aperture 437-2 (or vice versa, depending on perspective). A second stress member can enter through the aperture 437-3, in FIG. 4D, travel within the slot 452-2, and exit out of the aperture 437-4.

Figure 4G:
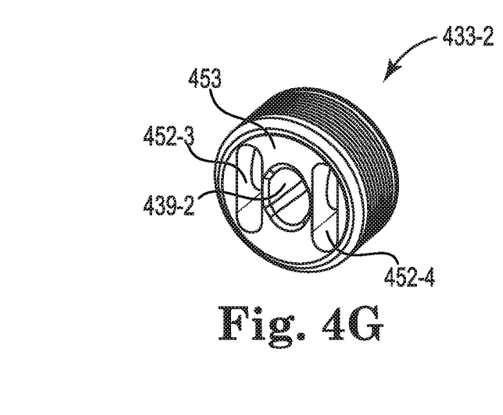
Figure 6A:
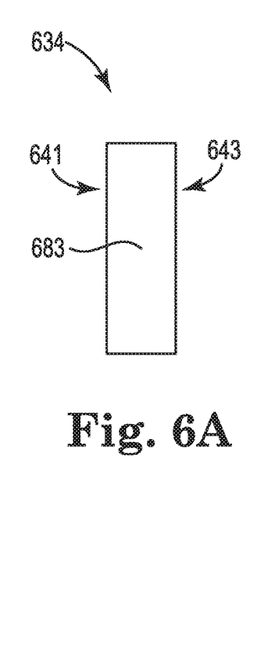
FIGS. 6A-6C illustrate various views of a stress member connector and/or a portion thereof.
Figure 6B:
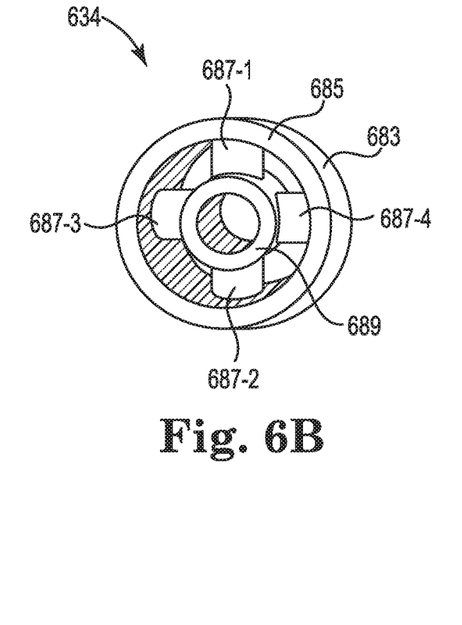
Figure 6C:
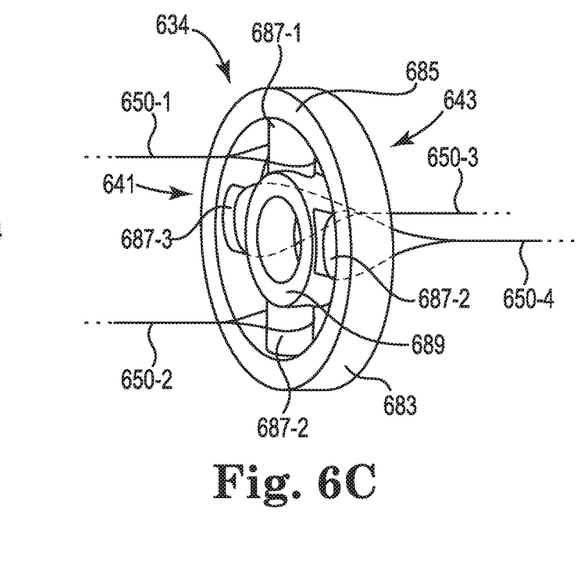

FIG. 4G illustrates a perspective view of the second component 433-2. The second component 433-2 includes the second side 443, as illustrated in FIG. 4C, and a second face 453. The second face 453 is located between the second component 433-2 and the connecting component 435 and is illustrated as visible by separating the second component 433-2 and the connecting component 435 and turning the left side of the second component 433-2 in FIG. 4A toward the viewer. The second face 453 of the second component 433-2, which is opposite the second side 443, can include a second set of parallel slots, such as slots 452-3 and 452-4. The second component 433-2 in FIG. 4G includes a third slot 452-3 and a fourth slot 452-4. The third slot 452-3 and the fourth slot 452-4 can be a set of parallel slots. The third and fourth slots 452-3 and 452-4 are configured to receive stress members (for example, stress members 350-3 and 350-4 as illustrated in FIG. 3B). For example, a third stress member can enter through aperture 445-1 (as illustrated in FIG. 4E), travel within slot 452-4, and exit out of aperture 445-2 (or vice versa, depending on perspective). A fourth stress member 350-4 can enter through the aperture 445-3 (illustrated in FIG. 4E), travel within the slot 452-3, and exit out of aperture 445-4 (or vice versa). Slots 452-1 and 452-2 are a first set of slots in a first orientation, illustrated as horizontal, and slots 452-3 and 452-4 are a second set of slots in a second orientation, illustrated as vertical. That is, the first set of slots is orthogonal and/or perpendicular to the second set of slots. While FIGS. 4A-4G illustrate an example of a stress member connector and/or associated components, embodiments are not so limited. For example, FIGS. 6A-6C illustrate an additional example of a stress member connector and/or associated components.

Figure 5A:
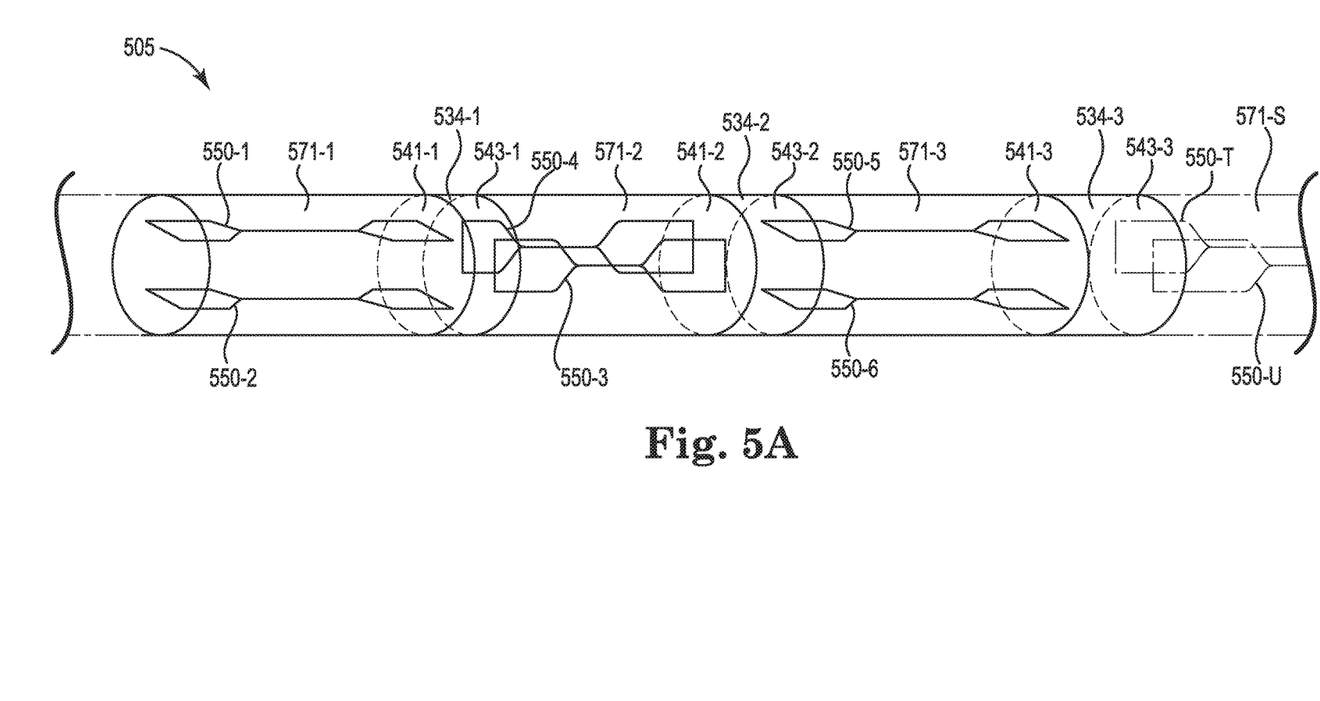
FIGS. 5A-5B each illustrate portions of a streamer.
Figure 5B:
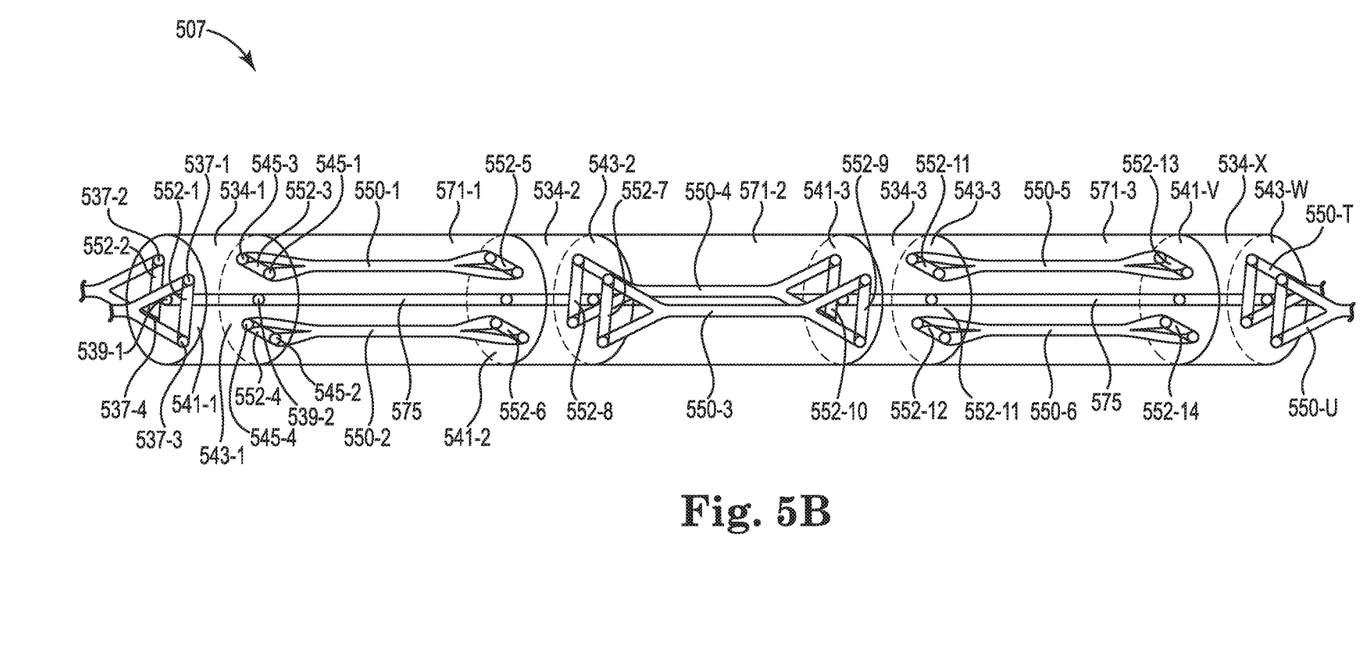

FIGS. 5A-5B each illustrates portions of a streamer. For example, streamer portions 571-1 and 571-2 can be the same streamer portions as 371-1 and 371-2 illustrated in FIG. 3B. As illustrated in FIG. 5A, a streamer 505 can include portions 571-1, 571-2, 571-3, 571-S. A first streamer portion 571-1 can include two stress members 550-1 and 550-2 coupled to a first stress member connector 534-1 through apertures of a first side 541-1 of the first stress member connector 534-1. The two stress members 550-1 and 550-2 are sometimes referred to herein as a first set of two stress members. The first streamer portion 571-1 can be a more proximal portion in relation to a marine survey vessel (such as the marine survey vessel 118 in FIG. 1) than a second streamer portion 571-2. The second streamer portion 571-2 can be a more distal portion in relation to the marine survey vessel than first streamer portion 571-1. The second streamer portion 571-2 can include two stress members 550-3 and 550-4 coupled to the first stress member connector 534-1 through apertures of a second side 543-1 of the first stress member connector 534-1. The two stress members 550-3 and 550-4 are sometimes referred to herein as a second set of two stress members. The stress members 550-3 and 550-4 can be coupled to a second stress member connector 534-2 through apertures of a first side 541-2 of the second stress member connector 534-2. A third streamer portion 571-3 can be a more distal portion than the first and second streamer portions 571-1 and 571-2. The first and second streamer portions 571-1 and 571-2 can be more proximal portions than third streamer portion 571-3.

Third streamer portion 571-3 can include stress members 550-5 and 550-6 coupled to the second stress member connector 534-2 through apertures of the second side 543-2 of the second stress member connector 534-2. The stress members 550-5 and 550-6 can be coupled to the first side 541-3 of a third stress member connector 534-3. An additional streamer portion 571-S can be distal to the first, second, and third streamer portions 571-1, 571-2, and 571-3. The additional streamer portion 571-S can include stress members 550-T and 550-U coupled to the third stress member connector 534-3 through the second side 543-3 of the third stress member connector 534-3. In this way, a streamer portion can include stress members that are axially nonaligned with stress members of a neighboring proximal and/or distal streamer portion. For example, the stress members 550-1 and 550-2 of the first streamer portion 571-1 can be axially nonaligned with the stress members 550-3, 550-4 and 550-T, 550-U of more distal streamer portions 571-2 and 571-4. Stress members 550-3 and 550-4 can be axially nonaligned with stress members 550-1, 550-2, 550-5, and 550-6 of more proximal streamer portion 571-1 and more distal streamer portion 571-3, respectively.

FIG. 5B illustrates the streamer 507 illustrated in FIG. 5A in more detail. Stress member 550-1 is coupled through aperture 545-1, slot 552-3, and aperture 545-3. Stress member 550-2 is coupled through aperture 545-2, slot 552-4, and aperture 545-4. The first side 541-1 of the first stress member connector 534-1 can be opposite the second side 543-1 of the first stress member connector 534-1. The second side 543-1 of the first stress member connector 534-1 can include apertures 537-1, 537-2, 537-3, and 537-4 and slots 552-1 and 552-2 for coupling stress members of a more proximal streamer portion. Slots 552-1 and 552-2 can make up a set of parallel slots. The first side 541-1 of the first stress member connector 534-1 can include a first central aperture 539-1 (such as central aperture 439-1 in FIGS. 4D-4G) for electrical and/or sensor connections 575 to run through the first stress member connector 534-1. The second side 543-1 of the first stress member connector 534-1 can also include a second central aperture 539-2 for this same purpose. Stress members 550-1 and 550-2 can be coupled through slots 552-5 and 552-6 to couple to the second stress member connector 534-2. Slots 552-5 and 552-6 are sometimes referred to herein as a first and second slot, respectively. Slots 552-5 and 552-6 can make up a set of parallel slots, sometimes referred to herein as a first set of parallel slots, illustrated as parallel and horizontal in FIG. 5B. A second streamer portion 571-2 can include stress members 550-3 and 550-4 coupled through slots 552-7 and 552-8 to the second stress member connector 534-2 and through slots 552-9 and 552-10 to the third stress member connector 534-3. Slots 552-7 and 552-8 are sometimes referred to herein as a third and fourth slot, respectively. Slots 552-7 and 552-8 can make up a set of parallel slots, sometimes referred to herein as a second set of parallel slots, illustrated as parallel and vertical in FIG. 5B. The first set of parallel slots 552-5 and 552-6 can be orthogonal to the second set of parallel slots 552-7 and 552-8.

The third streamer portion 571-3 can include stress members 550-5 and 550-6 coupled through slots 552-11 and 552-12 to the third stress member connector 534-3 and through slots 552-13 and 552-14 to a next stress member connector 534-X. Electrical and/or sensor connections 575 can run throughout and through streamer portions 571-1, 571-2, 571-3, etc. Stress members 550-T and 550-U are illustrated to demonstrate that the example above is not limited to three streamer portions but can include additional streamer portions and stress members. As illustrated in FIG. 5B, stress members 550-1 and 550-2 are axially aligned with stress members 550-5 and 550-6 (that is, slots receiving the stress members are in a same orientation). Stress members 550-1 and 550-2 are axially nonaligned with stress members 550-3 and 550-4. In this way, differential mode stress transfer can be minimized and/or eliminated. Advantageously, this can reduce an effect that the noise might otherwise have on sensor readings associated with the streamer.

FIGS. 6A-6C illustrate various views of a stress member connector 634 and/or a portion thereof. FIG. 6A is a side view of an outer surface 683 of the stress member connector 634. The stress member connector 634 includes a first side 641 and a second side 643 opposite the first side 641. FIG. 6B is a front perspective view of the stress member connector 634 if it was rotated almost 90 degrees from its orientation in FIG. 6A. The stress member connector 634 can include an outer ring 685 including the outer surface 683. The stress member connector 634 can include an inner ring 689 that is coupled to the outer ring 685 by arms 687-1, 687-2, 687-3, 687-4 can be generally cylindrical in shape. Each of the number of arms 687-1, 687-2, 687-3, 687-4 can radially extend out from the inner ring 689 to the outer ring 685. The arms 687-1, 687-2, 687-3, 687-4 can couple the inner ring 689 to the outer ring 685. A first arm 687-1 can be longitudinally aligned with a second arm 687-2 and a third arm 687-3 can be longitudinally aligned with a fourth arm 687-4. An axis of the first arm 687-1 and the second arm 687-2 can be perpendicular and/or orthogonal to the third arm 687-3 and the fourth arm 687-4.

FIG. 6C is a side perspective view of the stress member connector 634 of FIGS. 6A-6B that illustrates how stress members 650-1, 650-2, 650-3, 650-4 can be coupled thereto, as described below. The side perspective view illustrated in FIG. 6C shows the stress member connector 634 if it was rotated approximately 15 degrees from its orientation in FIG. 6A. The arms 687-1, 687-2, 687-3, 687-4 can be used for coupling of the stress members 650-1, 650-2, 650-3, 650-4.

A first stress member 650-1 can be coupled to a first arm 687-1 and a second stress member 650-2 can be coupled to a second arm 687-2. For example, the first stress member 650-1 can enter through a first side 641 of the stress member connector 634 and be looped around the first arm 687-1 and the second stress member 650-2 can enter through the first side 641 and loop around the second arm 687-2. In addition, a third stress member 650-3 can exit through a second side 643 and be looped around the third arm 687-3 and likewise the fourth stress member 650-4 can be looped around a fourth arm 687-4. The first stress member 650-1 and the second stress member 650-2 can be directed in a first direction (such as toward a marine vessel and to the left, as illustrated, and referred to herein as entering the stress member connector). The third stress member 650-3 and the fourth stress member 650-4 can be directed in a second direction (such as away from the marine vessel and to the right, as illustrated, and reference to herein as exiting the stress member connector). That is, the first stress member 650-1 and the second stress member 650-2 can be a first set of stress members entering the stress member connector 634. The third stress member 650-3 and the fourth stress member 650-4 can be a second set of stress members exiting the stress member connector 634.

A differential mechanical input to the stress member connector 634 in a plane defined by the entering stress members 650-1 and 650-2 would cause a pivoting action around the plane formed by the exiting stress members 650-3 and 650-4, which can result in a negligible output. While the example stress member connector 634 illustrates a particular method of coupling entering and exiting stress members, 650-1 to 650-4, respectively, to a stress member connector 634, examples are not so limited. FIGS. 4A-4G illustrate an additional example method of coupling. However, embodiments are not limited to these particular examples. Any number of embodiments that include a pivoting action around a plane formed by exiting and entering stress members, independent of the method of coupling and the structure of the stress member connector, can be used.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system, comprising:
    a head connector;
    a stress member connector;
    a tail connector;
    a first plurality of stress members coupled to the head connector and to the stress member connector, entering through a first side of the stress member connector; and
    a second plurality of stress members coupled to the tail connector and to the stress member connector, exiting through a second side of the stress member connector, wherein the second plurality of stress members are axially nonaligned with the first plurality of stress members.

2. The system of claim 1, wherein the system comprises a portion of a streamer.

3. The system of claim 1, wherein:
    the first plurality of stress members are received through a first set of parallel slots;
    the second plurality of stress members are received through a second set of parallel slots; and
    the first set of parallel slots is generally orthogonal to the second set of parallel slots.

4. The system of claim 1, wherein:
    the first plurality of stress members are received through a first set of parallel slots, the first set of parallel slots being in a first orientation;
    the second plurality of stress members are received through a second set of parallel slots, the second set of parallel slots being in a second orientation; and
    the first orientation and the second orientation are nonparallel orientations.

5. The system of claim 1, wherein each of the first plurality and the second plurality of stress members are coupled to the stress member connector through a set of apertures on each of the first side and the second side of the stress member connector.

6. The system of claim 1, wherein the stress member connector comprises:
    an inner ring;
    an outer ring; and
    a plurality of arms coupling the inner ring to the outer ring, wherein each of the plurality of arms are radially extending out from the inner ring toward the outer ring.

7. The system of claim 6, wherein a first and a second of the plurality of arms are longitudinally aligned with a first axis and a third and a fourth of the plurality of arms are longitudinally aligned with a second axis.

8. The system of claim 7, wherein an axis of the first and the second arms is perpendicular to the third and the fourth arms.

9. The system of claim 8, wherein a first set of two stress members enter at a first side of the stress member connector and are coupled to the first arm and the second arm.

10. The system of claim 9, wherein a second set of two stress members exit at a second side opposite the first side of the stress member connector and are coupled to the third and the fourth arm.

11. The system of claim 1, wherein the first side of the stress member connector and the second side of the stress member connector are fixed with respect to each other such that the second plurality of stress members remain axially nonaligned with the first plurality of stress members.

12. A streamer comprising:
    a plurality of streamer portions, each streamer portion having a proximal end and a distal end; and
    a plurality of stress member connectors, each of the plurality of stress members coupling the proximal end of one of the plurality of streamer portions to the distal end of an adjacent one of the streamer portions;
    wherein each of the plurality of stress member connectors comprise:
        a first side configured to receive one or more stress members from the proximal end of one of the streamer portions; and
        a second side configured to receive stress members from the distal end of one of the streamer portions such that the stress members from the distal streamer portion are axially nonaligned with the stress members from the proximal streamer portion.

13. The streamer of claim 12, wherein:
    a first consecutive one of the plurality of streamer portions comprises a first stress member and a second stress member;
    a first side associated with the first consecutive streamer portion comprises a first slot and a second slot, the second slot being substantially parallel to the first slot; and
    the first stress member is received in the first slot and the second stress member is received in the second slot.

14. The streamer of claim 13, wherein a second consecutive streamer portion of the plurality of streamer portions comprises:
    a third stress member and a fourth stress member;
    the second side associated with the second consecutive streamer portion comprises a third slot and a fourth slot, the fourth slot being substantially parallel to the third slot; and
    the third stress member is received in the third slot and the fourth stress member is received in the fourth slot;

wherein the first set of parallels slots is generally orthogonal to the second set of parallel slots.

15. The streamer of claim 14, wherein:
the first consecutive streamer portion includes stress members received within slots that are parallel to slots that receive stress members of a third consecutive streamer portion; and
the second consecutive streamer portion includes stress members within slots that are parallel to slots that receive stress members of a fourth consecutive streamer portion.

16. The streamer of claim 15, wherein the slots that receive the stress members of the first consecutive streamer portion and the third consecutive streamer portion are generally orthogonal to slots that received stress members of the second consecutive streamer portion and the fourth consecutive streamer portion.

17. The streamer of claim 12, wherein:
the first side is coupled to a first component of the stress member connector;
the second side is coupled to a second component of the stress member connector; and
the first component and the second component are coupled together such that the position of the first component is fixed relative to the second component.

18. A stress member connector, comprising:
a first component including a first set of parallel slots configured to receive a first set of stress members; and
a second component including a second set of parallel slots configured to receive a second set of stress members, wherein the second component is coupled to the first component such that the second set of parallel slots is generally orthogonal to the first set of parallel slots.

19. The stress member connector of claim 18, wherein a first side of the first component includes a plurality of apertures in communication with the first set of parallel slots and configured to receive the first set of stress members and a first face of the first component includes the first set of parallel slots.

20. The stress member connector of claim 19, wherein:
a first aperture and a second aperture of the plurality of apertures are in communication with a first slot of the first set of parallel slots and configured to receive a first stress member of the first set of stress members; and
a third aperture and a fourth aperture of the plurality of apertures are in communication with a second slot of the first set of parallel slots and configured to receive a second stress member of the first set of stress members.

21. The stress member connector of claim 19, wherein a second side of the second component includes a plurality of apertures configured to receive the second set of stress members and a second face of the second component, opposite the second side, includes the second set of parallel slots.

22. The stress member connector of claim 19, wherein the plurality of apertures comprises four apertures and each of the four apertures are equally spaced from the other of the four apertures.

23. The stress member connector of claim 18, wherein the first component and the second component are coupled together by each being connected to a connecting component positioned between the first component and the second component.

24. The stress member connector of claim 18, wherein the stress member connector is housed within a streamer.

25. The stress member connector of claim 18, wherein the second component is fixedly coupled to the first component such that the second set of parallel slots remains generally orthogonal to the first set of parallel slots.

* * * * *